(12) United States Patent　　(10) Patent No.:　　US 10,024,735 B2
Ignatowski et al.　　　　　　　　(45) Date of Patent:　　　Jul. 17, 2018

(54) HEAT ENERGY SENSING AND ANALYSIS FOR WELDING PROCESSES

(71) Applicant: Thermatool Corp., East Haven, CT (US)

(72) Inventors: Thomas Ignatowski, Orange, CT (US); Michael A. Nallen, Hampden, MA (US); Lesley D. Frame, New Haven, CT (US); Sean Patrick Lynch, New Haven, CT (US)

(73) Assignee: THERMATOOL CORP., East Haven, CT (US)

( * ) Notice: Subject to any disclaimer, the term of this patent is extended or adjusted under 35 U.S.C. 154(b) by 681 days.

(21) Appl. No.: 14/533,697

(22) Filed: Nov. 5, 2014

(65) Prior Publication Data

US 2015/0134292 A1　　May 14, 2015

Related U.S. Application Data

(60) Provisional application No. 61/901,585, filed on Nov. 8, 2013.

(51) Int. Cl.
*G01K 1/00*　　　　(2006.01)
*G01K 13/00*　　　(2006.01)
(Continued)

(52) U.S. Cl.
CPC .......... *G01K 13/00* (2013.01); *B23K 11/0873* (2013.01); *B23K 11/252* (2013.01); *B23K 11/36* (2013.01); *B29C 66/91216* (2013.01); *B29C 66/91221* (2013.01); *G01J 5/0018* (2013.01); *G01J 5/042* (2013.01); *G01J 5/043* (2013.01); *H04N 5/33* (2013.01); *G01J 5/025* (2013.01); *G01J 5/0806* (2013.01); *G01J 5/0812* (2013.01)

(58) Field of Classification Search
CPC ....................................................... G01K 13/00
See application file for complete search history.

(56) References Cited

U.S. PATENT DOCUMENTS 6,217,695 B1　　4/2001　Goldberg et al.
6,330,966 B1 *　12/2001　Eissfeller ........... B23K 37/0235
　　　　　　　　　　　　　　　　　　　　　　　219/125.1
(Continued)

FOREIGN PATENT DOCUMENTS

JP　　　61140384 A　　6/1986
WO　　95/32409 A1　　11/1995

*Primary Examiner* — Phuong Huynh
(74) *Attorney, Agent, or Firm* — Philip O. Post

(57) ABSTRACT

A series of time-sequenced heat energy data arrays or data stream sets of a weld process region are processed by a weld data array or data stream processing system to produce a heat energy data set output that is related to weld process region features or weld process region heat energy data. The heat energy data set output can be displayed to a system user and modified by system user input to the weld data array or data stream processing system; alternatively, or in combination, the system user output and input, the heat energy data set output, or data produced from the heat energy data set output by the weld data array or data stream processing system, can be transmitted to a weld process controller to adjust parameters in the weld process responsive to the output of the weld data array or data stream processing system.

30 Claims, 6 Drawing Sheets

(51) Int. Cl.
  B23K 11/25   (2006.01)
  H04N 5/33    (2006.01)
  G01J 5/00    (2006.01)
  G01J 5/04    (2006.01)
  B23K 11/087  (2006.01)
  B23K 11/36   (2006.01)
  B29C 65/00   (2006.01)
  G06F 11/30       (2006.01)
  G01J 5/08        (2006.01)
  G01J 5/02        (2006.01)

(56) References Cited

U.S. PATENT DOCUMENTS

2008/0237197 A1* 10/2008 Saito ............... B23K 11/061
                                                    219/78.01
2013/0075371 A1   3/2013 De Souza et al.

\* cited by examiner

HEAT ENERGY SENSING AND ANALYSIS FOR WELDING PROCESSES

CROSS REFERENCE TO RELATED APPLICATIONS

This application claims the benefit of U.S. Provisional Application No. 61/901,585, filed Nov. 8, 2013, hereby incorporated by reference in its entirety.

FIELD OF THE INVENTION

The present invention relates in general to analysis and/or control of welding processes and specifically welding process analysis and/or control that include weld region heat energy sensing, analysis of weld region heat energy sensing relative to the parameters of a welding process and/or adjusting the parameters automatically or manually of the sensed welding process responsive to the analysis and reported heat energy data arrays or data streams obtained from the heat energy sensing device.

BACKGROUND OF THE INVENTION

Optimization of welding processes requires attention to several parameters simultaneously. In many situations, these parameters include both spatial and thermal relationships between weld process materials and weld process ancillary apparatus or equipment. The weld process materials may include strip or other stock materials, tubing, welding rods, or other materials used in the welding process, and the weld process ancillary apparatus or equipment may include weld-roll boxes, impeders, mandrels, coolant lines, material handling, tooling, robotic arm assemblies for handling weld process materials or equipment, welding heat sources such as induction coils and electrical contact tips, welder unit, power supply unit, and other process ancillary apparatus or equipment.

One type of welding process is known as electric resistance welding (ERW), which can be used to weld the seam of tubular articles or products such as tubes and pipes from strip stock. The ERW process can also be used to weld engineered structural sections or products such as I-beams, and T-beams. The ERW process for tubular products involves the introduction of an electrical current at strip edges via induction or directly applied electrodes. The supplied current heats up the strip edges, which are then forged together when passed through a weld box.

FIG. 1(a) and FIG. 1(b) illustrate one example of ERW where tube 113 is formed from a metal strip forced together at weld point 115 to form weld seam 117 as the strip advances in the direction of the single headed arrow and pressure force is applied in the directions indicated by the double headed arrows to force the edge portions of the strip together. In FIG. 1(a) induction power can be supplied from a suitable ac power source (not shown in the figure) to induction coil 121 to induce current in the metal around a "V" (vee) shaped region formed by forcing edges of the strip together. The induced alternating current flows around the outside of the tube and then along the open vee-shaped edges to weld point 115 as illustrated by the typical flux line 119 (shown as dashed line) in FIG. 1(a). The length, 23, of this "V" shaped region can have a maximum value equal to the distance between the end of the coil closest to the weld point and the weld point.

FIG. 2 illustrates one example of an ERW process similar to the process in FIG. 1(a) and FIG. 1(b) except that induction coil 121 is replaced by a pair of contacts (electrodes) 8 and 9 as the supply of heat that in this example are connected to an electric current source which may be alternating current, or direct current, in other examples. FIG. 2 illustrates forge welding together at a weld point 1 a pair of edge surfaces 2 and 3 which can be the edge surfaces of a pair of metal strips 10 and 11 or the opposite edge surfaces of a single metal strip which has been deformed to form a tube as in the FIG. 1 process. The edge surfaces 2 and 3 are advanced in the direction of the arrow 4 and are separated by a gap 5 in advance of the weld point 1. In some processes, to take advantage of the "proximity effect," the gap is relatively small, and the angle 6 between the edge surfaces can be about 2 to 7 degrees, or other angles as deemed appropriate for the process. A weld seam 7 is present following the weld point 1. In this example high frequency electric current, e.g. current of a frequency of at least 10 kHz, is supplied to the edge surfaces 2 and 3 by way of a pair of contacts 8 and 9 in sliding engagement with the top surfaces 10 and 11 of the part or parts with one contact 8 at one side of the gap 5 and the other contact 9 at the other side of the gap 5. The contact 8 is adjacent to the edge surface 2, and the contact 9 is adjacent to the edge surface 3. Normally, there is a small spacing between the edge surfaces and the respective contact as shown. From the contacts 8 and 9, the high frequency current flows in the part or parts along a plurality of contiguous paths to the edge surfaces 2 and 3, only three of the paths for each contact, paths 16-17-18 and 19-20-21, being indicated in dotted lines in FIG. 2. With direct current or low frequency current, the amounts of current in each path is determined only by the resistance of each path, and therefore, the current in each path does not vary significantly. However, with high frequency current, the magnitude of current in each path is determined not only by the resistance of each path which, due to skin effect, is higher than the direct current resistance, but also by the reactance of each path.

It is one object of the present invention to provide a heat energy sensing and processing system and method for a weld region in a welding process that can include an electric resistance welding process, including electric resistance welding processes where a stock strip is welded into a tubular product, or a fusion welding process.

BRIEF SUMMARY OF THE INVENTION

In one aspect the present invention is a heat energy sensing and processing system and method for a welding process. A heat energy sensing device captures a series of time-sequenced heat energy data arrays or data stream sets of a weld process region. A weld data array or data stream processing system receives the series of time-sequenced heat energy data arrays or data stream sets of the weld process region that are processed by the weld data array or data stream processing system to produce a heat energy data set output for each one of the series of time-sequenced heat energy data arrays or data stream sets. The heat energy data set output comprises weld process region spatial features and/or weld process region heat energy data. A weld data array or data stream processing system user output can be provided for display of the heat energy data set output to a system user output device and a weld data array or data stream processing system user input device can be provided for a system user input to the weld data array or data stream processing system. A weld data array or data stream processing system weld process control output can be provided for transmitting the heat energy data set output, or weld process data derived from the heat energy data set output, to a weld process controller for adjusting weld process parameters responsive to the weld data array or data stream processing system weld process control output. A weld process control input can be provided for the weld data array or data stream processing system to receive a weld process controller output data; in response to the weld process controller output data, the weld data array or data stream processing system can transmit heat energy data set output, or weld process data derived from the heat energy data set output.

In another aspect the present invention is a heat energy sensing device such as a digital infrared camera or other heat sensor. A protective enclosure is provided to establish environmental control for the digital infrared camera or the other heat sensor. The sight path from the heat sensor to a target is controlled by using a gas purge, a positive gas pressure flow, or one or more physical containments of the sight path, or combinations thereof. The sight path can also be manipulated around one or more obstacles by using one or more front surface mirrors and physical containment of the sight path.

The above and other aspects of the invention are set forth in this specification and the appended claims.

BRIEF DESCRIPTION OF THE DRAWINGS

The figures, in conjunction with the specification, illustrate one or more non-limiting modes of practicing the invention. The invention is not limited to the illustrated layout and content of the drawings.

DETAILED DESCRIPTION OF THE INVENTION

The present invention comprises a system and method for heat energy sensing of a weld area or region in a welding process and processing data from a heat energy data array or data stream.

Figure 6:
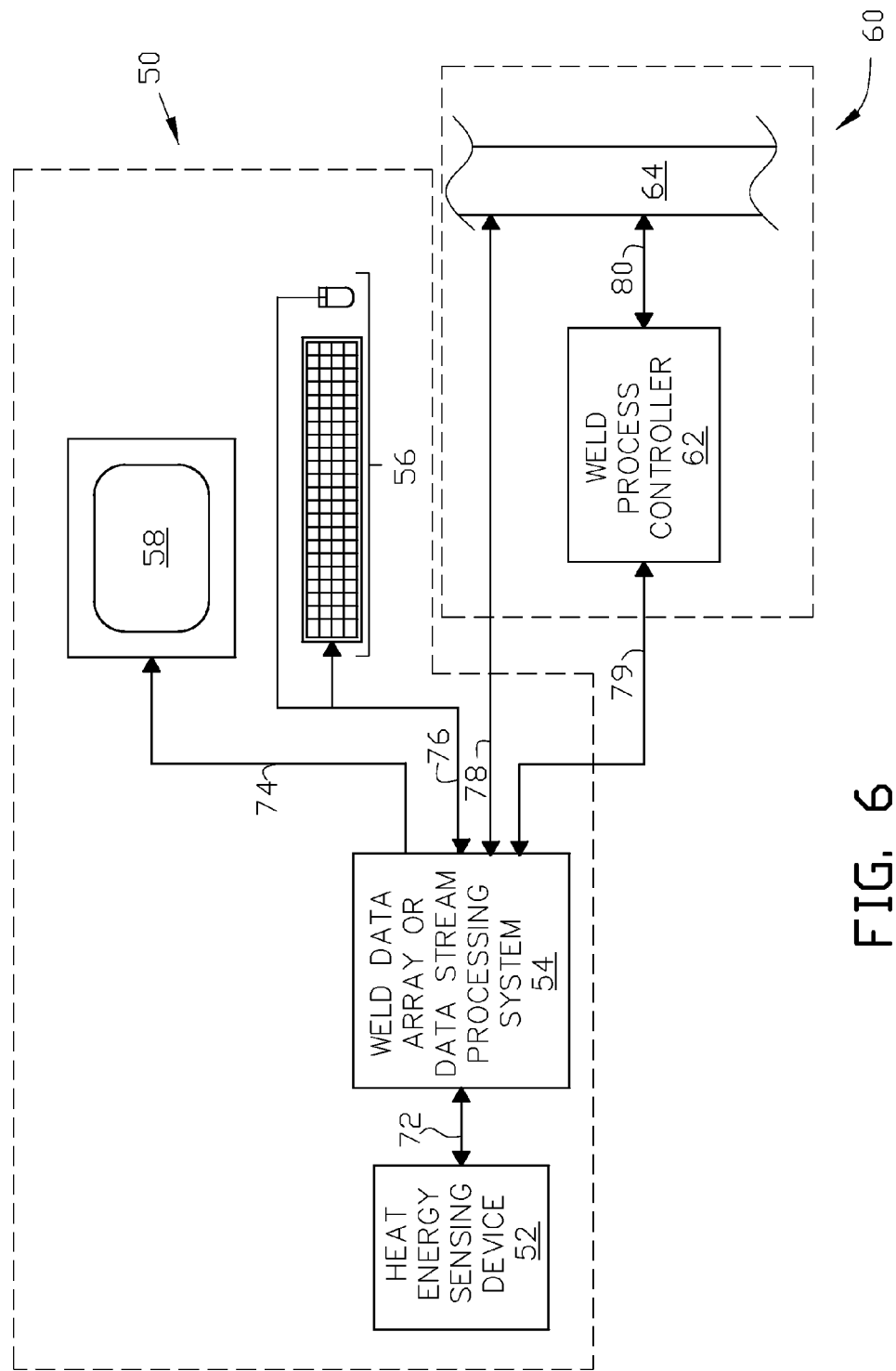
FIG. 6 is a block diagram of one example of a heat energy sensing and processing system for a welding process of the present invention.

As shown diagrammatically in FIG. 6, in one example of the invention the heat energy sensing and processing system 50 comprises a heat energy sensing device such as a thermal camera, or other heat sensing measurement device 52 (generally referred to as a "heat energy sensing device") positioned such that the weld process region is detectable by the device; at least one computer processor 54 (generally referred to as "a weld data array or data stream processing system"); system user (operator) input device 56 (such as a keyboard, joystick, touch pad and touch screen, or other suitable user input device); and system user output device 58 (such as a video display, and/or stack light indicators or other suitable user output device). The term "thermal imaging and processing system" is also referred to herein as a "heat energy sensing and processing system." The term "weld image processing system" is also referred to herein as the "weld data array or data stream processing system." The term "user input device" is also referred to herein as the "weld data array or data stream processing system user input device." The weld data array or data stream processing system executes a series of algorithms, commands, and/or image or data array or data stream analysis software code (generally referred to as "a weld sensing process software") that can be stored on a digital storage device within the weld data array or data stream processing system 54 or accessed from a remote storage location or device. The term "weld imaging process software" is also referred to herein as "one or more weld sensing process software" programs. Unless otherwise disclosed heat energy processing as disclosed herein is accomplished by the weld sensing process software in the weld data array or data stream processing system with a suitable computer processor such as a programmable logic controller or other suitable computer processor. The heat energy data array or data stream received (captured) by the thermal camera or other heat energy sensing device is inputted (either by hardwire connection or wirelessly) to the weld data array or data stream processing system at a suitable data acquisition rate, for example 50 frames per second for a thermal camera video stream, that is not limited to the heat energy sensing device data acquisition rate, to produce a series of time-sequenced heat energy data arrays or data stream sets of the weld process region. Digital data points making up each frame or data array or data stream set are a coded heat energy intensity value for each digital data point in the frame or data array or data stream set where each data point, for example, may be coincident with each input pixel from the heat energy sensing device. The temperature ranges corresponding to the sensed and inputted heat energy radiation ranges are generally large, for example, from sub-ambient (0-25° C.) to 2,000° C. depending on the particular welding process being sensed and analyzed. The digital data points can be processed by the weld data array or data stream processing system to digitally and/or mathematically remove signal noise, for example due to the presence of steam, smoke, fluids, splatter or intermittent obstructions in the field of view using digital signal processing (DSP) or other means. The digital data points can be processed by the weld data array or data stream processing system to produce heat energy data of: the welding process; achieved weld process temperatures or heat energy; magnitude of input weld process heat, distribution of heat energy in the weld area, and geometry of selected weld process features in the weld process region and weld process apparatus in the weld process region.

In some embodiments of the invention the weld process region heat energy data can comprise a measurement and the production of a "relative Vee-Heat" for example, by the weld sensing process software. "Relative Vee-Heat" is used as one relative measure, among a series of possible measures, of electrical resistance welding "heat input." "Relative Vee- Heat" is a unit-less parameter defined as the weighted heat signature of the weld vee area in electrical resistance welding. The value of this unit-less parameter is calculated by the weld sensing process software based on the analysis of the heat energy data arrays or data stream sets. Relative Vee-Heat can be used as one parameter among a series of possible parameters, for process control during electric resistance welding.

The heat energy sensing device can include a variety of apertures, lenses, or other means (referred to as sight path elements) to direct or modify the transmission of heat energy from the target to the heat energy sensing device (referred to as the sight path) to provide focal length and field of view options, and the lens can be formed from materials such as Gallium Arsenide that provide optical infrared signal enhancement or filtering. Lenses can be used to augment filtering to further reduce signal noise due to the presence of steam, smoke, or other contamination. Optionally front reflecting mirrors can be used in some embodiments of the present invention so that indirect viewing of the heat energy radiation exhibited from the weld process region by the heat energy sensing device can be achieved. Additionally an air purge, sight tube with positive air pressure flow, air knife, enclosure with controlled atmosphere, and/or other similar devices can be used to keep the heat energy sensing device and sight path elements free from contaminants and other debris.

Figure 7A:
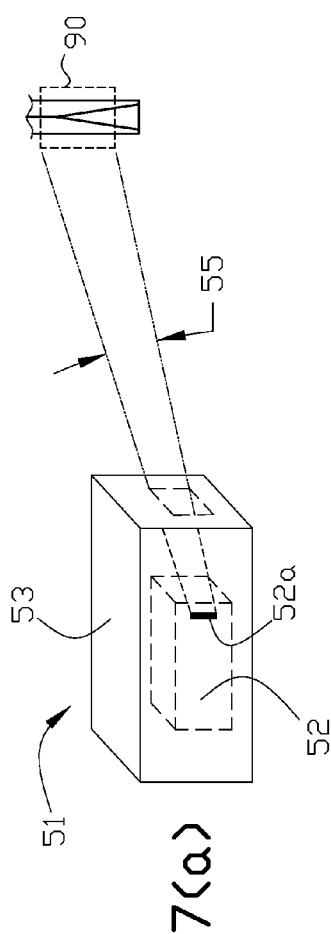
FIG. 7(a), FIG. 7(b) and FIG. 7(c) illustrate examples of a heat sensing device of the present invention with control of the sight path from the device's heat energy sensor to a target such as a weld processing area.
Figure 7B:
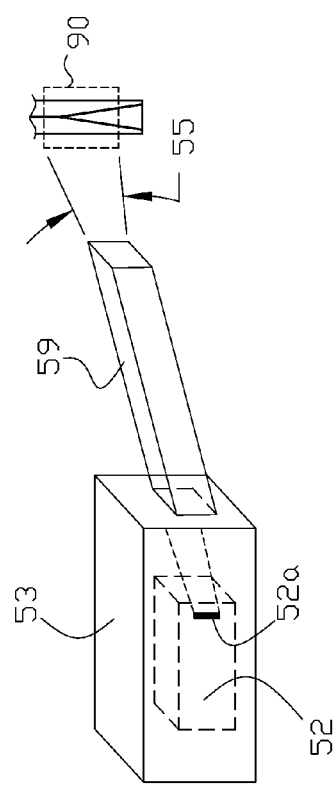
Figure 7C:
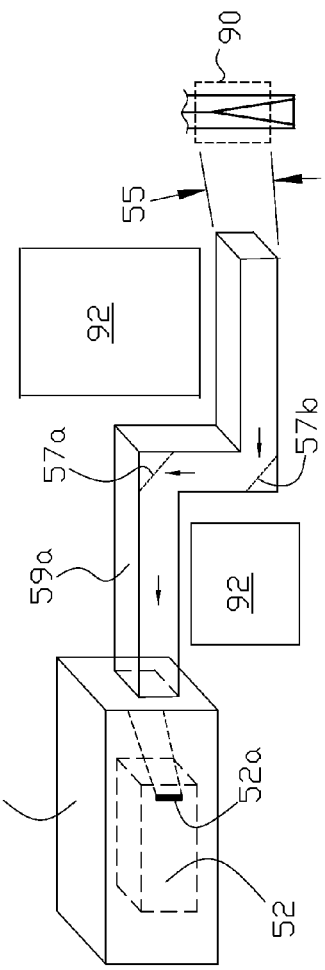

In one embodiment of the present invention as diagrammatically illustrates in FIG. 7(a) the heat energy sensing device comprises a heat energy sensing device 51 utilizing a digital infrared camera or other type of heat energy sensor 52 that is disposed within a protective enclosure 53 for protection from the environment around the camera or heat energy sensor. The sight path 55 from the input heat energy sensor 52a of the digital infrared camera or other type of heat energy sensor to a target region 90, such as a weld process region, can be controlled by using a gas purge or positive gas pressure flow in sight path 55, and physical containment of the sight path, for example, with a sight tube or other sight path structure 59 as shown in FIG. 7(b) for another embodiment of the present invention. As shown in another embodiment of the present invention in FIG. 7(c) the portion of the sight path between protective enclosure 53 and target 90 can be manipulated around one or more obstacles 92 by using one or more surface mirrors 57a and 57b within sight tube 59a containing bends or other non-linear geometry as necessary. In another embodiment of the present invention, the sight path can be continuously manipulated by using cable or tube operating with a total internal reflection (TIR) phenomenon to direct the heat energy stream to the heat energy input sensor 52a of the digital infrared camera or other type of heat energy sensor; for example fiber optic cable in the instance of visible light signals. In another embodiment of the present invention one or more lenses, one or more filters and/or one or more windows in the sight path can be provided for the heat energy input sensor 52a to physically control unwanted signal noise caused by intermittent obstruction in the sight path to the target due to environmental factors such as smoke, spume, water, steam, mist and dust, and for electromagnetically controlling the unwanted signal noise by filtering specific wavelength ranges in the electromagnetic spectrum that are associated with the intermittent obstructions.

The inputted heat energy data array or data stream set can be digitally processed by the weld sensing process software by the weld data array or data stream processing system to identify high-contrast features in each time-sequenced data array or data stream set (for example, points, lines and other heat energy-related geometric features in the data set) to produce a contrast map of the high-contrast features. The operator (system user) can input to the weld data array or data stream processing system a selectable heat energy process type, and if desired, a general region of interest in the data array or specific features of the sensed weld zone that can be automatically identified and continuously monitored at selectable time or tube length intervals by the weld data array or data stream processing system executing the weld sensing process software to return geometry (weld process region features) and heat energy data (weld process region heat energy data) matching the data acquisition rate for the sensor system that can be outputted for display to the operator on a suitable user output device such as a video screen.

In some embodiments of the invention the weld data array or data stream processing system user input device includes means for a user's input specification for one or more target heat energy data values for the data array heat energy data output; user's input specification for an acceptable range for the target heat energy data values for the data array heat energy data output; user's input specification for one or more weld area setup details (for example vee length, vee angle, weld roll position, impeder position, or other relevant aspects of the weld area); and user's input specification of one or more details of the product being welded in the welding process. For example the means for a user's input specifications may be input data fields displayed to the user on a touch screen display during execution of the one or more weld sensing process software programs by the weld data array or data stream processing system.

In some embodiments of the present invention the weld data array or data stream processing system user input device can optionally be a remote weld-sensing-process-software access monitoring and control device that is physically isolated from the weld data array or data stream processing system user input device and a primary user input station where one or more system user input devices are located, for example, by being located off-site from the weld process line and primary user input station or in a room or location separate therefrom on-site. The remote monitoring and control device can be connected to the heat energy sensing and processing system either by hardwire connection, for example a wired Ethernet link or a suitable wireless connection.

In FIG. 6 link 72 represents at least heat energy sensing device 52 heat energy data digitized either at the device's output or analog output digitized in weld data array or data stream processing system 54 via a suitable communications link. Weld data array or data stream processing system 54 can optionally output signals to device 52 for example device 52 sensor positioning control via a suitable communications link. Link 74 represents separate user output device 58 (display screen 58 in this example) and link 76 represents separate one or more user input devices (keyboard and mouse 56 in this example). In alternate examples the user output and input device may be combined into a single device such as display touch screen communicating with the weld data array or data stream processing system either via a wired or suitable wireless two-way communications link. Link 79 represents either a single direction (weld data array or data stream processing system 54 output to controller 62) or two-way communications link between data array or data stream processing system 54 and weld process controller 62. Weld process controller 62 can be a suitable computer processing device, for example, a programmable logic controller (PLC) provided as a component of the induction welder apparatus. The weld process controller 62 outputs signals to mill process line 64 responsive to data array or data stream processing system 54 inputs to weld processor controller 62 via communications link 80. If link 80 is a two-way communications link process line 64 can output process line variables such as line speed to the weld process controller 62 via link 80 and weld processor controller 62 can in turn, output the process line variables via link 79 to the weld data array or data stream processing system. Link 78 represents either a single direction (weld data array or data stream processing system 54 output to process line 64) or two-way communications link between data array or data stream processing system 54 and process line 64. For example weld data array or data stream processing system 54 can send a weld process deviation signal to activate a weld line marking device, such as a spray paint marking, along the longitudinal length of a tubular product being forge welded when the weld data array or data stream processing system identifies a condition outside of an acceptable tolerance value. In all examples of the invention each of the communications links represents either individual or multiplexed physical signal paths transmitted by hard wiring (copper or optical) or suitable wireless communications links, or combinations thereof.

Figure 1A:
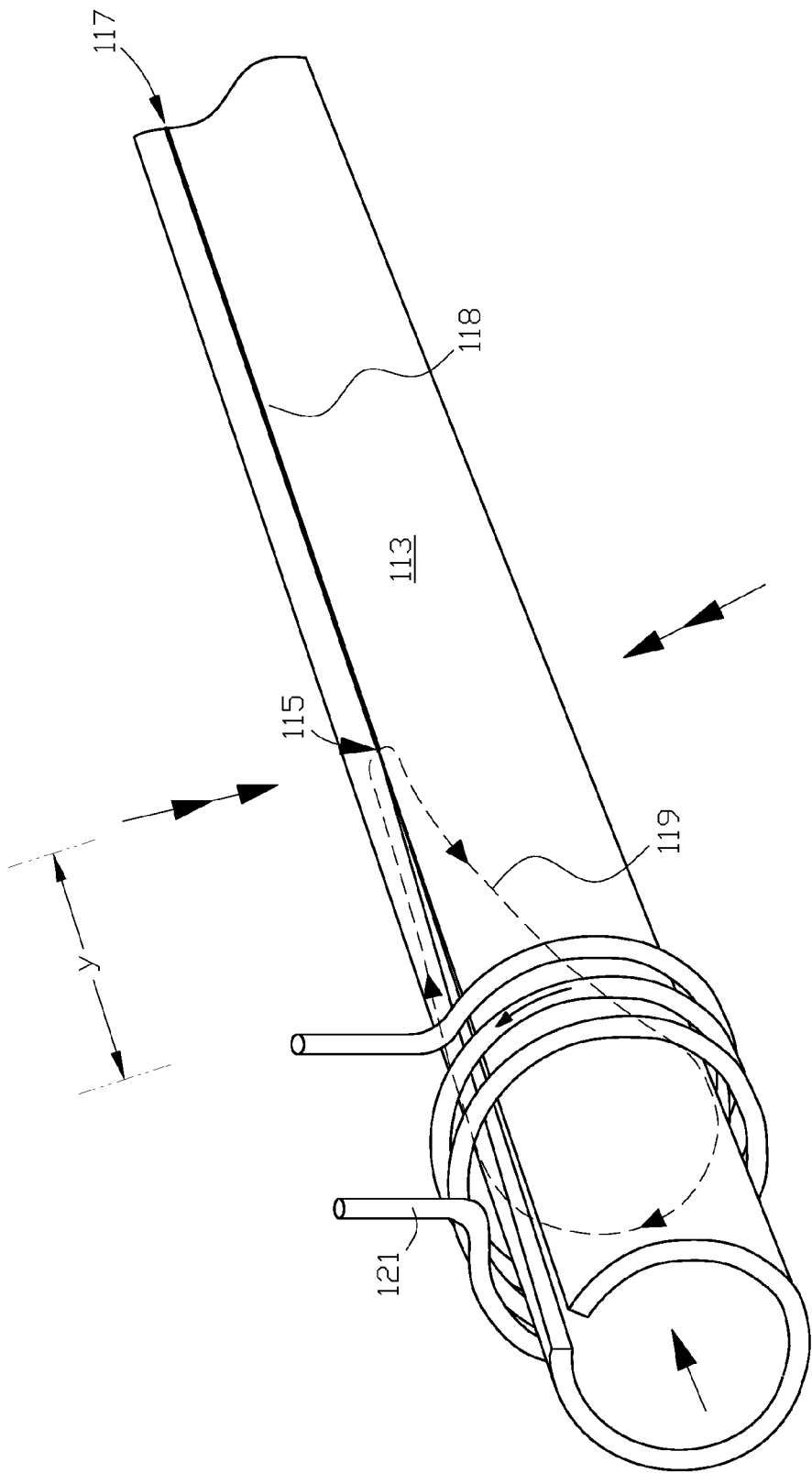
FIG. 1(a) and FIG. 1(b) illustrate one example of an electric resistance welding process where an induction coil is used as the welding heat source.
Figure 1B:
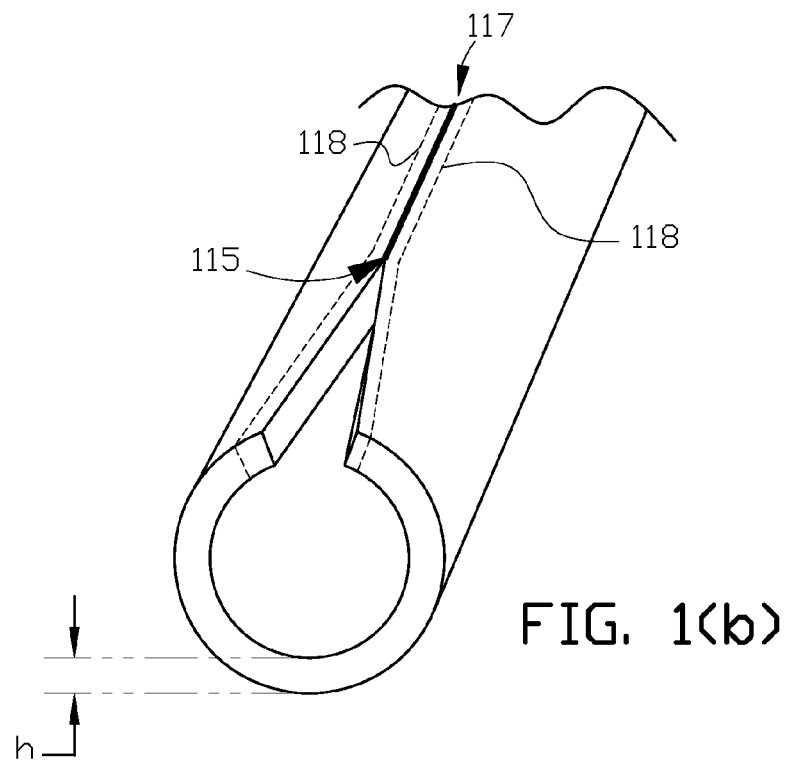
Figure 3:
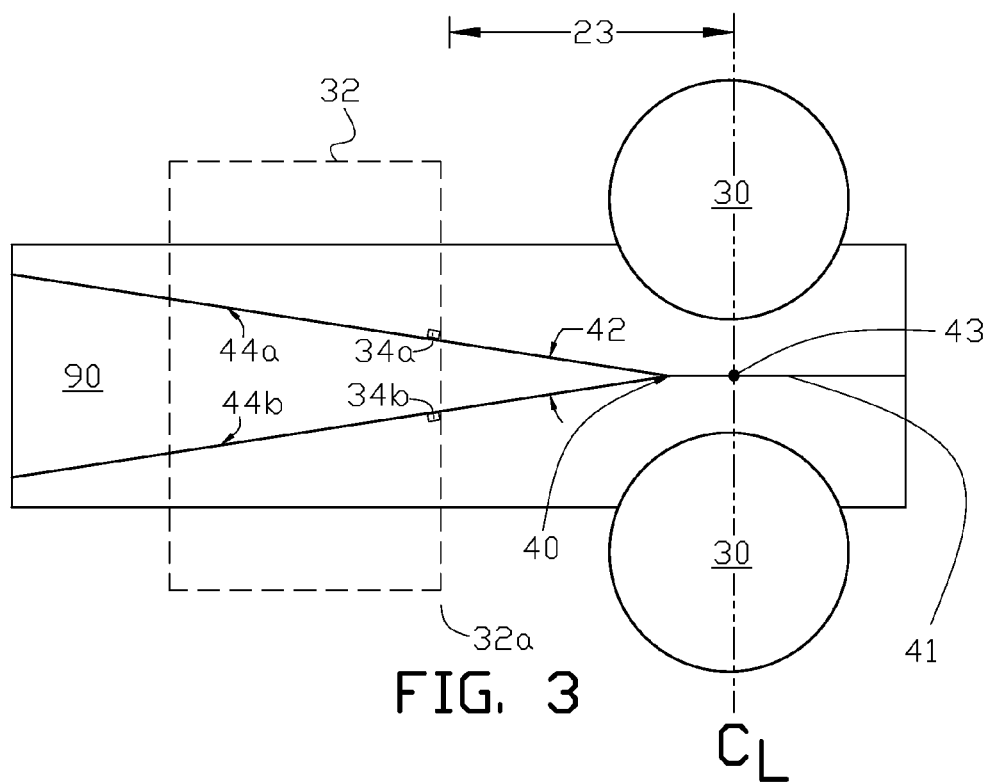
FIG. 3 diagrammatically illustrates typical weld process strip material and weld process equipment used in an electric resistance welding process.
Figure 2:
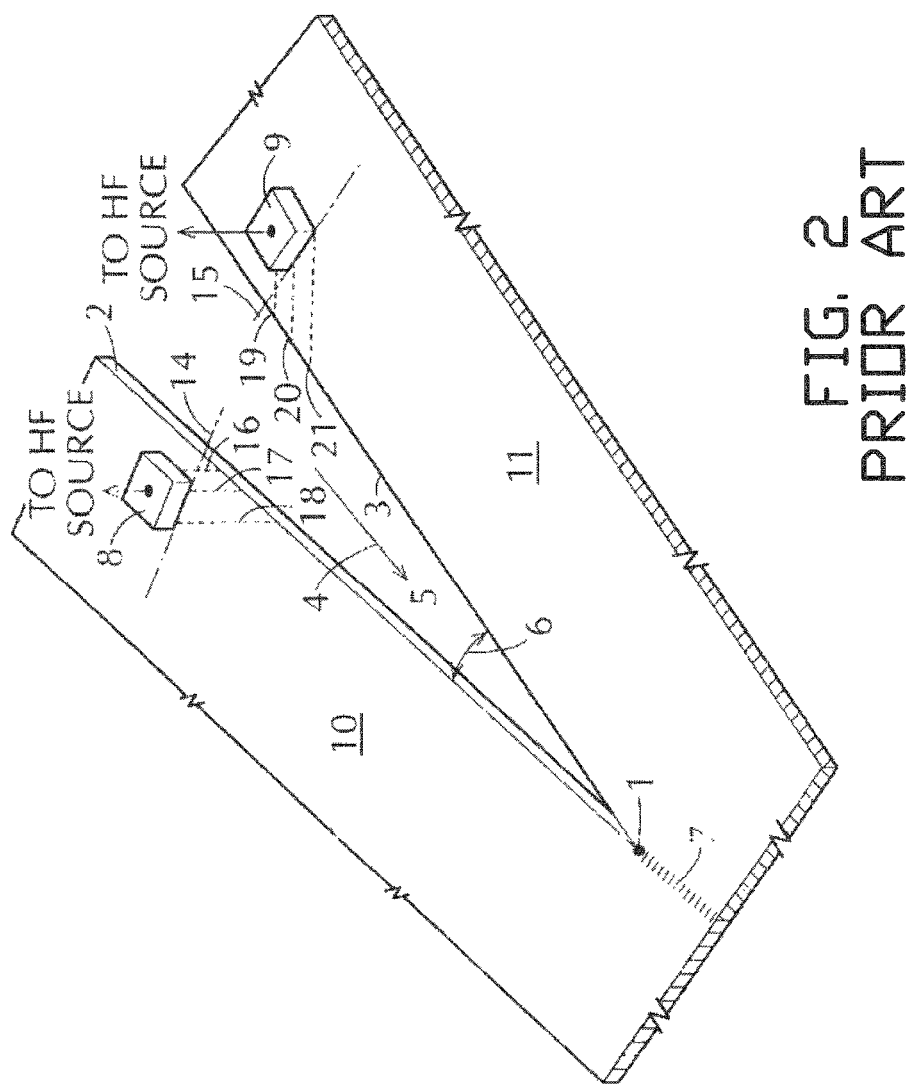
FIG. 2 illustrates one example of an electric resistance welding process where a pair of contacts or electrodes is used as the welding heat source.

FIG. 3 diagrammatically illustrates typical electric resistance welding process parameters and process apparatus for stock strip 90 that is being rolled and welded into a tubular article, namely: forge rolls 30 (typically installed in a weld box that is not shown) that apply pressure to the stock strip resulting in the welded seam 41 as the stock strip moves from left to right in the figure; the general location of an induction coil 32 shown in dashed lines or pair of electrical contacts 34a and 34b; the vee apex 40, the forge (or weld) point 43 which is necessarily at the approximate centerline $C_L$ of forge rolls 30; the vee angle 42 and the opposing edges of the stock strip that form the opposing vee edges 44a and 44b as the stock strip approaches the forge rolls.

Figure 4:
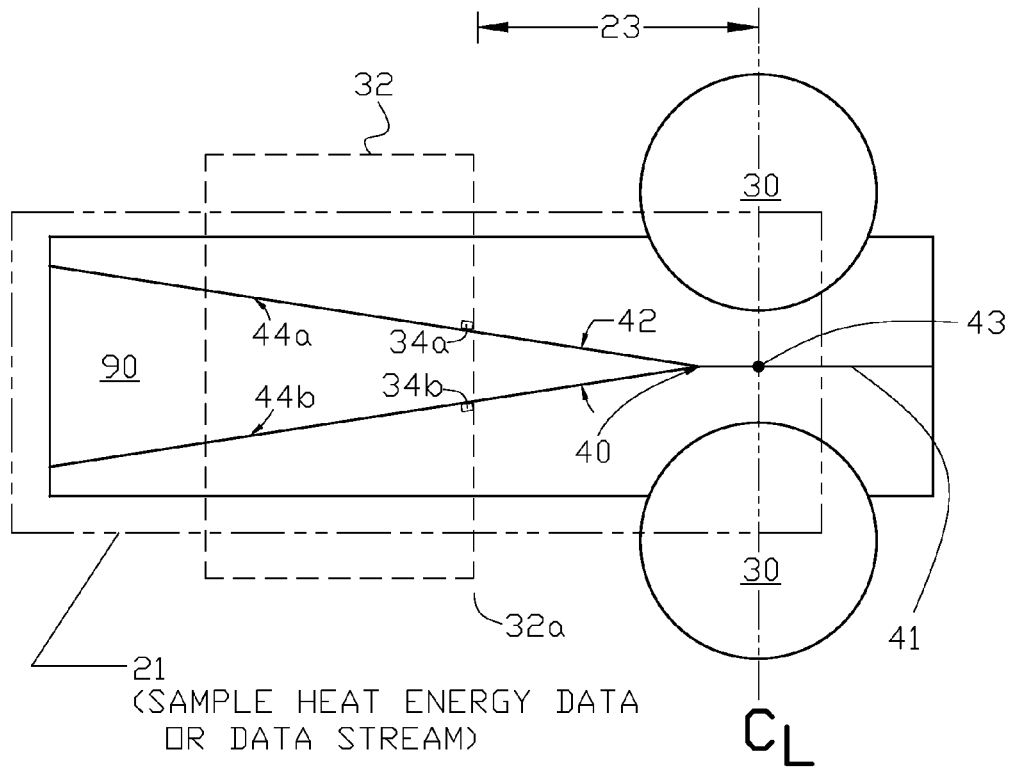
FIG. 4 diagrammatically illustrates one example of a target weld area for a sample heat energy data or data stream in an electric resistance welding process with a heat energy sensing and processing system of the present invention.

For an electrical resistance welding process, heat energy sensing can be directed, for example, at weld process region 21 as bounded by the box in dashed-lines in FIG. 4, such that at least a portion of the heated strip edges 44a and 44b are detectable. The heat energy data array or data stream captures heat energy data for the heated edges 44a and 44b of the vee, and, when detectable, the vee apex 40, the forge point 43, and the positions of weld rolls 30. The contrast in heat energy data between the hot weld vee edges and the colder interior region of the tube below the vee edges (or the top surface of an optional impeder within the tube below the vee edges), or other weld process region background features can be displayed in sharply defined high-contrast lines on the data array or data stream output (heat energy data array or data stream output as weld process region features) to an operator by the weld data array or data stream processing system, for example, on a monochrome or polychrome video display or the weld data array or data stream processing system output device. These high-contrast variations in heat energy data can be automatically identified digitally by the weld data array or data stream processing system executing the weld sensing process software, and the opposing vee edges can be calculated as two curves on the processing system output displayed data array plane from a curvilinearization of the opposing vee edges by execution of the weld sensing process software. The intersection of these curves can also be calculated by the weld sensing process software as the vee apex 40 in FIG. 4, and the angle between these curves representing the opposing vee edges can also be calculated as the vee angle 42 by the weld sensing process software. The positions (coordinates) of the induction coil or contact tips, which are also generally referred to as weld heat elements, used in the welding process can be similarly determined by heat energy data array or data stream variation and/or image contrast of pixels in the case of a thermal camera sensing device with the weld data array or data stream processing system executing the weld sensing process software and/or with user input via a weld data array or data stream processing system user input device. The position data (relative weld region positioning data, for example, vee, vee weld point, and vee facing end of the weld heat elements and rolls relative positions) that can be outputted by the weld processing system to the operator for each one of the series of time-sequenced heat energy data array or data stream analyzed can include, but is not limited to the: (1) vee length (23) which starts approximately at the edge 32a of the induction coil 32 as shown in outline in FIG. 3 and FIG. 4 (or alternatively electrical contacts 34a and 34b) nearest rolls 30 and ends at the vee apex 40; (2) vee angle 42; and (3) vee apex 40 positions. All geometric features automatically identified and analyzed by the weld data array or data stream processing system may also be manually identified and analyzed by the operator.

The geometric and position data (weld process region features) can be tracked and trended by the weld data array or data stream processing system to monitor variation and fluctuation in the heat energy data array output of the series time-sequenced heat energy data arrays or data stream sets, including the vee length, vee angle and vee apex position. Analysis of the variations and fluctuations in each of the parameters by the weld sensing process software can be used to identify non-optimum weld process control and product quality to the operator. For example, changes in vee angle (caused by a non-stable or "breathing" vee) are important as an indicator of strip width; uniform tube forming; constant strip line feed speed; and constant forge pressure applied by the weld rolls.

The heat energy data array output for each one of the series of time-sequenced heat energy data arrays or data stream sets as disclosed herein generally comprises weld process region features that include geometric positioning that is also referred to as weld process region features. The heat energy data array output for each one of the series of time-sequenced heat energy data arrays or data stream sets can also include weld process region heat energy data.

Figure 5:
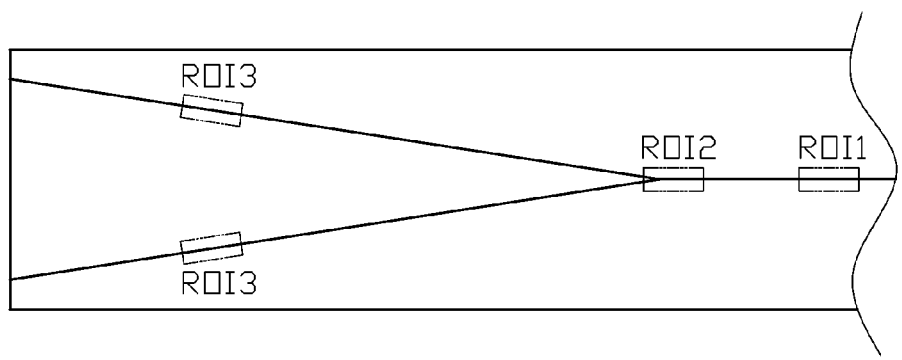
FIG. 5 diagrammatically illustrates one example of selected regions of interest located within a weld process region for weld process region heat energy data utilized in the heat energy sensing and processing system of the present invention.

A region of interest (ROI) can be automatically selected by the weld processing system or manually selected by operator input to the weld processing system along the heated opposing vee edges, at the vee apex and at a welded seam point, as shown by the diagrammatic example in FIG. 5 for regions of interest ROI3, ROI2 and ROI1, respectively. The heat energy intensity represented by the array of data points (for example pixels in the case of a thermal camera sensing device) within these regions of interest as identified by the dashed rectangular box can be mathematically averaged, and with additional mathematical processing, these multiple regions of interest can be combined as a summed weighted average (or other mathematical algorithm) by the weld data array or data stream processing system that results in a single heat energy data stream from each one of the series of time-sequenced heat energy data arrays or data stream sets. The weighted single heat energy data stream can be used to reflect actual heat fluctuations of the weld process region that physically or digitally filter sporadic heat energy fluctuations caused, for example, by process coolant in the field of the heat energy sensing view, steam or smoke, arcing, or other anomalies generated by the weld process and at least temporality obstructing the heat energy sensing view. The weld process region heat energy data can also be based on relative heat energy intensities rather than absolute heat energy values (an example of absolute heat energy values may be temperature). Absolute temperature measurement is possible, provided all necessary variables are known; however, the use of relative heat energy intensities based on the emitted radiant heat energy of a thermal source (object, for example, a weld process region feature) provides a more consistent and accurate representation of the true heat energy state of the object. The reason for this in the case of thermal camera sensing devices is that (infrared) thermal imaging cameras are able to measure the infrared intensity of an object (that is, radiated heat energy). The detected sources of heat energy are summed in Equation 1.

$$E_I = E_E + E_T + E_R - E_L + C \quad \text{(Equation 1)}$$

From Equation 1, the measured (detected) incident energy, $E_I$, depends on the heat energy emitted from the thermal source, $E_E$, plus heat energy transmitted through the target object from a remote source, $E_T$, plus heat energy reflected from neighboring sources, $E_R$, less all losses, $E_L$, due to transmissivity, scattering and absorption by the surrounding atmosphere, plus some correction factor, C, that may include other losses and energy additions not mentioned here but can be determined for a particular welding process. $E_I$ can be converted to absolute temperature when the material property emissivity is known. The emissivity of an object or material is a function of the material's surface finish, the material composition, the material's temperature, and the infrared wavelength range of interest, among other conditions. For any process involving temperature fluctuations of the target material, the emissivity of the target material is necessarily changing. Because emissivity is not usually known for any given material over all temperatures, compositions, surface finishes, wavelengths, and other relevant conditions, a relative heat energy value based on the raw incident energy detected by the heat energy sensing device can provide a more reliable and repeatable representation of the thermal characteristics of the process than the absolute temperature when determined through non-contact sensing of heat energy.

The present invention may rely on absolute temperature measurement when deemed appropriate for a particular welding process. The present invention also employs relative heat energy data for weld process control and monitoring. Heat energy data (heat energy data array or data stream output) can be outputted by the weld data array or data stream processing system to a suitable digital data storage device. The heat energy data can be logged to the digital data storage device in real-time, or as an average of multiple data sets of the series of time-sequenced heat energy data arrays or data stream sets as an optional operator weld process step, or as a predetermined set of optimization parameters identified by the weld sensing process software with or without user input. The outputted heat energy data output can be tracked by the weld data array or data stream processing system to allow weld process control based on selected alarm points so that a weld process parameter, including but not limited to, welding electric power magnitude and/or frequency, strip process line feed speed; weld fixture (including roll position and weld box configuration); forge pressure; contact or induction coil position or electrode positioning (in a fusion weld process); process coolant flow and positioning; optional impeder positioning and functionality; vee length and heat "soak" time before welding; heat input; and forge (or fusion) weld position are adjusted either manually or automatically to compensate for trends to higher or lower than expected heat energy values. For example automatic electric power adjustment can be made with immediate power adjustment or with delayed (dwell delay) adjustment at incremental power levels to allow for weld process system equilibration and to ensure that all anomalously high or low heat energy measurements are properly ignored. Dwell delay can be adjusted to suit a particular weld process system using a proportional-integral-derivative (PID) loop, stored product recipes, feedback and feed-forward programs, and/or other suitable means. Data trending can be performed by the weld data array or data stream processing system as a function of time (time stamp) or distance (length of tubular product produced). For automatic welding processes an interface control apparatus (data translator) can be provided between an output of the weld data array or data stream processing system and the input to the weld process controller, if necessary, to translate the weld data array or data stream processing system's heat energy data set output into a weld processor input compatible with the weld process controller.

In some embodiments of the invention proportional gain control or a proportional-integral-derivative control is utilized in the heat energy sensing and process system based on: the weld data array or data stream processing system control input for receiving the process controller output; a user input specifying a target heat energy data value for the heat energy data set output; and the heat energy data set output to a weld process controller.

As illustrated in FIG. 6 heat energy data set, including weld process region features and weld process region heat energy data, and weld process parameters analyzed therefrom by the weld data array or data stream processing system 54 can be transmitted to the weld process controller 62 for control of weld process line 64 in the weld process system 60 (either directly or via a data translator) so that the weld process controller can adjust one or more weld process parameters based upon the input data from the weld data array or data stream processing system 54.

The weld process region illustrates one weld process region for heat energy data set output from the weld data array or data stream processing system of weld process region features and weld process heat energy data. Selection of other bounded weld data array or data stream process regions, for example, a region of interest for heat energy sensing can be predetermined, for example, by including an algorithm for selection of one or more bounded weld data array or data stream process regions in the weld sensing process software, or manually selected by an operator input to the weld data array or the data stream processing system for data logging and trending either via the weld data array or data stream processing system or a computer system external to the weld data array or data stream processing system in communication with the weld data array or data stream processing system.

In some embodiments of the invention the weld data array or data stream processing system output can also comprises a data log and at least one trending chart of the heat energy data set output whereby the heat energy data set can be represented as a function of a time period in the welding process, the length of the product (such as a tube) being welded in the welding process, and/or a unique product identifier (such as a product's unique barcode or other code marker) of the product being welded in the welding process.

The systems and methods of the heat energy sensing and processing of the present invention are particularly applicable to process control and process monitoring for continuous welding processes such as high frequency welding and welding of tubular products (using high frequency or other welding processes) where weld region heat input (weld process region heat energy data) and geometry/positioning (weld process region features) are important variables in process quality.

The systems and methods of heat energy sensing and processing of present invention are particularly applicable to monitoring the weld vee in high frequency welding processes to ensure stable weld process conditions, vee angle, vee apex and weld quality. The systems and methods of heat energy sensing and processing of the present invention can also be applied to monitoring electrode-based fusion welding processes to monitor the position of the electrode tip, which can be useful for robotic or automatic welding operations that will allow adjustment of electrode position without human intervention.

In addition to the weld process region features and weld process region heat energy data disclosed above, the heat energy sensing and processing system of the present invention can be used to monitor strip edge-to-opposing-edge heat input difference; impeder (if used) performance and geometric weld process region features or heat energy features pertaining to the weld process region not otherwise described above.

In some embodiments of the present invention the welding process is controlled by sensing a series of time-sequenced heat energy data arrays or data stream sets of a weld process region; executing a weld sensing process software program in a weld data array or data stream processing system; transmitting the series of time-sequenced heat energy data arrays or data stream sets of the weld process region to the weld data array or data stream processing system; producing a heat energy data set output for each one of the series of time-sequenced heat energy data arrays or data stream sets, the heat energy data set output comprising at least one weld process region feature or weld process region heat energy data; and transmitting the heat energy data set output to a welding process system interface. The welding process system interface can comprise a system user input device or a weld process system control device.

A mill is a machine or a collection of machines that receive a raw product and apply processing steps to transform the raw product into an intermediate or final product. For example for an electrical resistance welding tube mill, the raw product consists of a coil of strip, and the collection of machines can include: tooling for forming the strip into a tube shape; a welder for joining the opposing edges of the tube seam; process heating equipment; process straightening equipment; process resizing or reshaping equipment; and a means for cutting the tube such as an in-line shear or saw, or other suitable equipment.

In some embodiments of the present invention the heat energy data set output can be transmitted to a mill process system through which a mill process indicator system can be imitated (triggered) to identify or mark nonconforming product when outside of the defined process control limits. A mill process system can be any means of connecting mill components through dedicated programs, servers, direct link, or other suitable means such that individual components receive inputs and outputs from other components on the mill. In one example of a mill process system an in-line inspection system may output a signal to a paint marking system that marks the product while moving though the process line with paint when nonconforming product exists. In a second example of a mill process system, a mill may be equipped with a barcode labeling and reading system to send or receive an output to/from other mill components for product recipe recall and traceability.

In some embodiments of the present invention heat energy data set output to a mill cutting system can be utilized to initiate (trigger) changes to cutting lengths and electrical welding frequencies, for example, to reduce scrap and improve quality assurance sampling. A mill cutting system can be an in-line shear or cutoff saw used for cut-to-length product, pre-cut product, sampling for quality assurance purposes or other purposes.

In some embodiments of the invention the weld process heat energy data can be recorded for conducting secondary data processing to determine process variability, including predictive algorithms to anticipate and reduce process variability. Secondary data processing can include statistical analysis of data sets using separate software, image analysis of video or image files using separate software, generating reports from heat energy data, combining heat energy data with other mill data values to calculate parameters such as scrap weight and cost, power usage and power efficiency, water consumption and efficiency, mill tooling performance and wear rates or other similar parameters relating to the weld process.

The terminology "each one of the series of time-sequenced heat energy data arrays or data stream sets" is used to describe a series of data sets (for example frames in a video for thermal camera sensors) processed by the weld data array or data stream processing system regardless of whether the series of data sets processed is equal to the series of data sets received by the processing system; that is the terminology includes processing of all received data sets; processing of selected received data sets (for example every second received set); or batch processing of a series of received data sets.

The term "a welding process system interface" as used herein refers to a weld data array or a data stream processing system user input or output device or a weld process controller.

The term "transmitting" when used herein generally means transmission either by a hardwire connection or a wireless connection with suitable signal protocols.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. A heat energy sensing device comprising:
a digital infrared camera or heat sensor;
a protective enclosure providing an environment control for the digital infrared camera or heat sensor;
a sight path from the digital infrared camera or heat sensor to a target, the sight path controlled by at least one of a gas purge, a positive gas pressure flow and one or more physical containments of the sight path; and
one or more front surface mirrors in combination with the one or more physical containments of the sight path to manipulate the sight path around one or more obstacles.

2. The heat energy sensing device of claim 1 further comprising one or more lenses, one or more filters and/or one or more windows for physically controlling an unwanted signal noise due to an intermittent obstruction in the sight path due to smoke, spume, water, steam, mist and dust, and for electromagnetically controlling the unwanted signal noise by a filtering for one or more wavelength ranges.

3. A heat energy sensing and processing system for a welding process, the heat energy sensing and processing system comprising:
a heat energy sensing device for capturing a series of time-sequenced heat energy data arrays or data stream sets of a weld process region or at least one heat energy weld region of interest located within the weld process region wherein the series of time-sequenced heat energy data arrays or data stream sets comprises an array of pixels and an absolute or relative heat energy value assigned to each one of the array of pixels within the weld process region or the at least one heat energy weld region of interest; and
a weld data array or a data stream processing system for executing one or more weld sensing process software programs, the weld data array or the data stream processing system receiving the series of time-sequenced heat energy data arrays or data stream sets of the weld process region or the at least one heat energy weld region of interest, each one of the series of time-sequenced heat energy data arrays or data stream sets processed by the weld data array or the data stream processing system to produce a heat energy data set output for each one of the series of time-sequenced heat energy data arrays or data stream sets.

4. The heat energy sensing and processing system of claim 3 wherein the series of time-sequenced heat energy data arrays or data stream sets is not affected by an emissivity, a viewing angle and an ambient lighting level, and does not require a user input of the emissivity.

5. The heat energy sensing and processing system of claim 3 wherein the series of time-sequenced heat energy data arrays or data stream sets is converted to a relative multi-bit function to represent a weld heat input or a weld heat energy including a temperature value.

6. The heat energy sensing and processing system of claim 3 further comprising a weld data array or data stream processing system user output for a display of the heat energy data set output to at least one system user output device.

7. The heat energy sensing and processing system of claim 3 further comprising a weld data array or data stream processing system user input device for a system user input to the weld data array or data stream processing system.

8. The heat energy sensing and processing system of claim 6 wherein the weld data array or data stream processing system user output further comprises a data log and at least one trending chart of the heat energy data set output whereby the heat energy data set output can be represented as a function of a time period in the welding process, a length of a tubular product being welded in the welding process, and/or a unique product identifier of a product being welded in the welding process.

9. The heat energy sensing and processing system of claim 7 wherein the weld data array or data stream processing system user input device comprises a remote weld sensing process software programs access monitoring and control device accessed via a wireless or an Ethernet link to an off-site control system or in a room or a location separate from the weld data array or data stream processing system user input device and a primary user input station.

10. The heat energy sensing and processing system of claim 7 wherein the weld data array or data stream processing system user input device further comprises:
a first user input field of the system user input to specify one or more target heat energy data values for the heat energy data set output;
a second user input field of the system user input to specify an acceptable range for the one or more target heat energy data values for the heat energy data set output;
a third user input field of the system user input for one or more weld area setup details; and
a fourth user input field of the system user input for one or more details of a product being welded in the welding process.

11. The heat energy sensing and processing system of claim 3 further comprising a weld data array or data stream processing system weld process control output for transmitting the heat energy data set output to a weld process controller.

12. The heat energy sensing and processing system of claim 3 further comprising a weld data array or data stream processing system weld process control input for receiving one or more weld process controller outputs.

13. The heat energy sensing and processing system of claim 12 further comprising a scaling function for modifying the one or more weld process controller outputs to match a process parameter unit scales.

14. The heat energy sensing and processing system of claim 12 further comprising a proportional gain control or a proportional-integral-derivative control, the proportional gain control or the proportional-integral-derivative control based on: the weld data array or data stream processing system control input for receiving the one or more process controller outputs; a user input specifying one or more target heat energy data values for the heat energy data set output; and the heat energy data set output to a weld process controller.

15. The heat energy sensing and processing system of claim 3 wherein the heat energy data set output comprises at least one weld process region feature.

16. The heat energy sensing and processing system of claim 3 wherein the heat energy data set output is stored and analyzed by the weld data array or data stream processing system for a variation in the heat energy data set output of the series of time-sequenced heat energy data arrays or data stream sets of the weld process region or the at least one heat energy weld region of interest located within the weld process region.

17. The heat energy sensing and processing system of claim 16 further comprising a digital and mathematical data filtering of an unwanted signal noise caused by a welding process variable, the welding process variable including smoke, spume, steam, mist and dust.

18. The heat energy sensing and processing system of claim 15 wherein the welding process is an electrical resistance welding process for a tube and the at least one weld process region feature comprises at least one heat energy contrast data array of one or more weld process region background features comprising an interior region of the tube located below a pair of vee edges or a surface of an impeder positioned within the tube below the pair of vee edges, and at least one of: a weld area; a weld vee; a first weld vee edge and a second weld vee edge, the second weld vee edge opposing the first weld vee edge and forming the pair of vee edges; a vee weld point; a vee seam point, and at least one of: a pair of weld rolls closest to a vee apex; and a vee facing end of a weld heat element nearest to the weld vee.

19. The heat energy sensing and processing system of claim 18 wherein the at least one heat energy contrast data array comprises a first heat energy contrast data array between the first weld vee edge and the second weld vee edge of the weld vee and the one or more weld process region background features from each one of the series of time-sequenced heat energy data arrays or data stream sets.

20. The heat energy sensing and processing system of claim 18 wherein the heat energy data set output further comprises a relative weld region positioning data outputted to at least one system user output device, the relative weld region positioning data calculated by the weld data array or data stream processing system from a curvilinearization of the first weld vee edge and the second weld vee edge of the weld vee from the at least one heat energy contrast data array where a relative weld process positioning data comprises at least one of: a vee length, a vee relative position, a vee weld point relative position; the vee facing end of the weld heat element and the pair of weld rolls.

21. The weld process region heat energy data of claim 3 further comprises a measurement and a production of a relative Vee-Heat in the at least one heat energy weld region of interest.

22. The heat energy sensing and processing system of claim 3 wherein the absolute or relative heat energy value assigned to each one of the array of pixels within the at least one heat energy weld region of interest in each one of the series of time-sequenced heat energy data arrays or data stream sets is averaged to a single region of interest absolute or relative heat energy value by the weld data array or data stream processing system executing the one or more weld sensing process software programs so that an outputted heat energy weld region data from the weld data array or data stream processing system comprises a series of the single region of interest absolute or relative heat energy values for each one of the series of time-sequenced heat energy data arrays or data stream sets.

23. The heat energy sensing and processing system of claim 3 wherein the at least one heat energy weld region of interest comprises a plurality of heat energy weld regions of interest zone and the absolute or relative heat energy value assigned to each one of the array of pixels within each one of the plurality of heat energy weld regions of interest in each one of the series of time-sequenced heat energy data arrays or data stream sets is averaged to a single absolute or relative heat energy value by the weld data array or data stream processing system executing the one or more weld sensing process software programs, and the single absolute or relative heat energy value in all of the plurality of heat energy weld regions of interest in each one of the series of time-sequenced heat energy data arrays or data stream sets is mathematically summed as a collective weighted average absolute or relative heat energy value so that a heat energy weld region data outputted to at least one system user output device comprises a series of the collective weighted average absolute or relative heat energy values for each one of the series of time-sequenced heat energy data arrays or data stream sets.

24. The heat energy sensing and processing system of claim 3 wherein the at least one heat energy weld region of interest comprises a plurality of heat energy weld regions of interest and the absolute or relative heat energy value assigned to each one of the pixels within the array of pixels as part of the plurality of heat energy weld regions of interest in each one of the series of time-sequenced heat energy data arrays or data stream sets is processed to produce a curve or a collection of curves representing an absolute or relative heat energy profiles in all of the plurality of heat energy weld regions of interest in each one of the series of time-sequenced heat energy data arrays or data stream sets is mathematically summed as a collective weighted average absolute or relative heat energy profiles so that a heat energy weld region data are outputted to at least one system user output device, the heat energy weld region data comprising a series of the collective weighted average absolute or relative heat energy profiles for each one of the series of time-sequenced heat energy data arrays or data stream sets.

25. The heat energy sensing and processing system of claim 3 wherein the heat energy data set output comprises a weld process heat energy data of an emissivity of a thermal source located within the weld process region.

26. A method of controlling a welding process comprising:
   sensing a series of time-sequenced heat energy data arrays or data stream sets of a weld process region or an at least one heat energy weld region of interest located within the weld process region wherein the series of time-sequenced heat energy data arrays or data stream sets comprises an array of pixels and an absolute or relative heat energy value assigned to each one of the array of pixels within the weld process region or the at least one heat energy weld region of interest;
   executing a weld sensing process software program in a weld data array or data stream processing system;
   transmitting the series of time-sequenced heat energy data arrays or data stream sets of the weld process region or the at least one heat energy weld region of interest to the weld data array or data stream processing system;
   producing a heat energy data set output for each one of the series of time-sequenced heat energy data arrays or data stream sets, the heat energy data set output comprising at least one weld process region or heat energy weld region of interest feature or weld process region or heat energy weld region of interest heat energy data; and
   transmitting the heat energy data set output to a welding process system interface.

27. The method of claim 26 wherein the welding process system interface comprises a weld data array or data stream processing system user input or output device or a weld process controller.

28. The method of claim 26 further comprises transmitting the heat energy data set output to a mill process system, the mill process system including an indicator system to initiate identification or marking of a nonconforming mill product outside of one or more process control limits.

29. The method of claim 26 further comprises transmitting the heat energy data set output to a mill cutting system, the mill cutting system including controls to initiate a change in a cutting length of a mill product or a change in an electrical welding frequency.

30. The method of claim 26 further comprising recording the heat energy data set output for a secondary data processing to determine process variability.

* * * * *